United States Patent [19]

Kliot

[11] Patent Number: 5,528,800
[45] Date of Patent: Jun. 25, 1996

[54] COMBINATION EYEGLASSES AND INTERCHANGEABLE FASHION ACCESSORY

[76] Inventor: Eugene Kliot, 145 W. 67th St., Suite 21H, New York, N.Y. 10023

[21] Appl. No.: 229,839

[22] Filed: Apr. 19, 1994

[51] Int. Cl.⁶ ........................................... G02C 3/02
[52] U.S. Cl. ......................................................... 24/3.3
[58] Field of Search .......................... 351/155–157; 24/3 C, 3 M, 298–302, 3 G, 3.3

[56] References Cited

U.S. PATENT DOCUMENTS

| D. 178,328 | 7/1956 | Tilton . | |
|---|---|---|---|
| 3,874,776 | 4/1975 | Seron . | |
| 4,743,105 | 5/1988 | Tabacchi . | |
| 4,761,068 | 8/1988 | Star . | |
| 4,930,885 | 6/1990 | Laschober | 351/156 |
| 5,005,263 | 4/1991 | Barrett . | |
| 5,092,667 | 3/1992 | Bagley . | |
| 5,181,052 | 1/1993 | McClellan . | |
| 5,201,856 | 4/1993 | Edwards | 351/156 X |
| 5,369,452 | 11/1994 | Williams | 351/157 |

FOREIGN PATENT DOCUMENTS

| 0201462 | 11/1986 | European Pat. Off. . |
|---|---|---|
| 2626188 | 7/1989 | France . |
| 2704658 | 11/1994 | France . |
| 8521724 | 1/1986 | Germany . |
| 2175791 | 12/1986 | United Kingdom . |
| 8801495 | 3/1988 | WIPO . |
| 9114195 | 9/1991 | WIPO . |

Primary Examiner—James R. Brittain
Attorney, Agent, or Firm—James A. Quinton

[57] ABSTRACT

Eyeglasses having eyeglass accessories releasably attached to the temple pieces of the eyeglasses to allow a fashion accessory such as headgear to be interchangeably interconnected to the glasses are provided. The connectors joining the headgear to the eyeglasses are substantially hidden from view during use. The fashion accessory is securely attached to the eyeglasses so that it cannot be dislodged from the eyeglasses by pulling during normal use. The fashion accessory preferably headgear typically is chosen from a variety of different types of headgear such as fashion head ties, head bands, ear warmers, hats and scarfs.

11 Claims, 4 Drawing Sheets

COMBINATION EYEGLASSES AND INTERCHANGEABLE FASHION ACCESSORY

BACKGROUND OF THE INVENTION

1. Field of the Invention

The field of the invention is eyeglasses and in particular eyeglasses connected to a fashion accessory such as headgear.

2. Description of the Prior Art

It is known to provide elastomeric straps for retaining eyeglasses during sports activities. The most typical attachment of such straps employs a slidable loop for engagement on the temple pieces of eyeglasses. See for example, U.S. Pat. No. 3,874,776. Such products have suffered from the disadvantage that they can easily slide off the glasses. Attempts to remedy this disadvantage are many. For example, it has been proposed that an eyelet be permanently imbedded into the frame of the glasses and a spring bar closing a hook be attached to a string for attachment to the glasses. See for example, U.S. Pat. No. 5,005,263. It has also been proposed that an elastomeric stretch band be attached to the glasses. Integral tubular members are provided in the elastomeric band which are held onto the temple pieces by friction. Devices for detachably securing the ends of a strap to eyeglasses have also been proposed. See for example, U.S. Pat. No. 4,743,105 and U.S. Pat. No. 4,761,068. However, such devices are crude looking and do not give a smooth, fashionable appearance to the glasses in use.

Sunglasses that have ties in place of temple pieces have been proposed. See Design Pat. No. 178,328. However, there is still a need for eyeglasses which can be effectively interconnected with a fashion accessory.

SUMMARY OF THE INVENTION

Glasses have become a part of a fashionable wardrobe to be coordinated with the rest of the wardrobe. Thus, many people have multiple pairs of both correction and sunglasses. Many fashion conscious people desire to change the look of their eyeware depending on the particular activity. According to the invention, eyeglasses are provided which allow the user to interconnect to their glasses to a variety of different types and styles of accessories preferably headgear to suit his or her mood, the activity or weather conditions.

The present invention relates to eyeglasses having eyeglass accessories preferably headgear releasably attached to the temple pieces of the eyeglasses to allow a fashion accessory such as headgear to be interchangeably interconnected to the glasses. According to the invention the connectors joining the headgear to the eyeglasses are substantially hidden from view during use. The fashion accessory is securely attached to the eyeglasses so that it cannot be dislodged from the eyeglasses by pulling during normal use. The fashion accessory preferably headgear typically is chosen from a variety of different types of headgear such as fashion head ties, head bands, ear warmers, hats and scarfs.

It is an object of the invention to provide a combination of eyeglasses and interconnected fashion accessory such as headgear.

It is an object of the invention to provide a combination of eyeglasses and interchangeable fashion accessory such as headgear.

It is an object of the invention to provide eyeglasses and interconnected headgear wherein the headgear cannot be dislodged by normal pulling forces.

It is an object of the invention to provide a combination headgear and eyeglasses wherein the connection between the headgear and the eyeglasses is concealed from view.

The present invention is directed to a combination of eyeglasses and a fashion accessory such as headgear. According to the invention eyeglass frames having left and right temple pieces are provided. Attached to the temple pieces are left and right temple connectors. A fashion accessory such as cloth headgear is secured to the side of each temple piece. The headgear includes a first and second tubular sleeve formed on opposites sides of the headgear. The tubular sleeves are adapted for receipt of the temple pieces. A first and second sleeve connector are located in each tubular sleeve of the headgear and are adapted for mating with the temple connectors. Desirably the sleeves conceal the first and second sleeve connector from view. The first and second sleeve connectors are secured to the tubular sleeves of the fashion accessory within the tubular sleeve so that the end of the tubular sleeve conceals the connection between the sleeve connector and the temple connectors when the connectors are mated. The temple connectors positively interlock with the sleeve connectors so the fashion accessory is attached to the temple pieces. Desirably the sleeve connectors can be readily disconnected by pushing a tab or the like so that fashion accessory such as headgear can be interchanged with different styles or types of headgear. When the sleeve connectors are engaged with the temple connectors, a positive interlock is formed. As a result, the fashion accessory e.g., headgear cannot be dislodged from the glasses by pulling on the headgear. Thus, an attractive fashion accessory preferably headgear, eyeglass combination is obtained.

The preferred embodiment of the present invention is illustrated in the drawings and examples. However, it should be expressly understood that the present invention should not be limited solely to the illustrative embodiment.

DETAILED DESCRIPTION OF THE DRAWINGS

DETAILED DESCRIPTION OF THE INVENTION

According to the invention, eyeglasses are provided which allow the user to interconnect to eyeglasses to a variety of different types and styles of accessories preferably headgear to suit his or her mood, the activity or weather conditions. The present invention relates to eyeglasses having a fashion accessory, preferably headgear releasably attached to the temple pieces of the eyeglasses to allow the fashion accessory preferably headgear to be interchangeably interconnected to the glasses. Preferably the headgear is selected from fashion head ties, head bands, ear warmers, hats, and scarves. Most preferably fashion head ties, scarves and ear warmers are comprehended. The headgear can be made from a variety of materials such as natural and synthetic cloths, e.g., cotton, nylon, polyester, silk and wool or natural rubber and synthetic rubber, for example, neoprene. The glasses can be any glasses that would include temple pieces. Preferably the glasses are sunglasses, although corrective glasses or protective goggles may be employed according to the invention. Connectors for joining the headgear to the eyeglasses are provided along the temple pieces of the eyeglasses. The connectors can be provided either on the inside or the outside of the temple pieces. A fashion accessory such as headgear preferably cloth headgear is attached to the eyeglasses so that it cannot be dislodged from the eyeglasses by pulling during normal use. The cloth headgear preferably includes a first and second tubular sleeve formed on opposite sides of the headgear. The tubular sleeves are adapted for receipt of the temple pieces. Optionally the headgear can consist of two separate pieces such as a left and right cloth head tie or left and right cloth scarf, each of which includes a sleeve for receipt of a temple piece. Left and right connectors for mating with the temple piece are located in each tubular sleeve of the headgear. Desirably both the temple and the sleeve connectors are concealed from view during the use by the tubular sleeve of the headgear.

The left and right sleeve connectors are securely attached to the fashion accessory preferably cloth headgear. Preferably the left and right sleeve connectors are resiliently retractably attached to the fashion accessory (e.g. headgear) so that headgear can be comfortably worn and so that the connectors retract within the sleeve.

Figure 1:
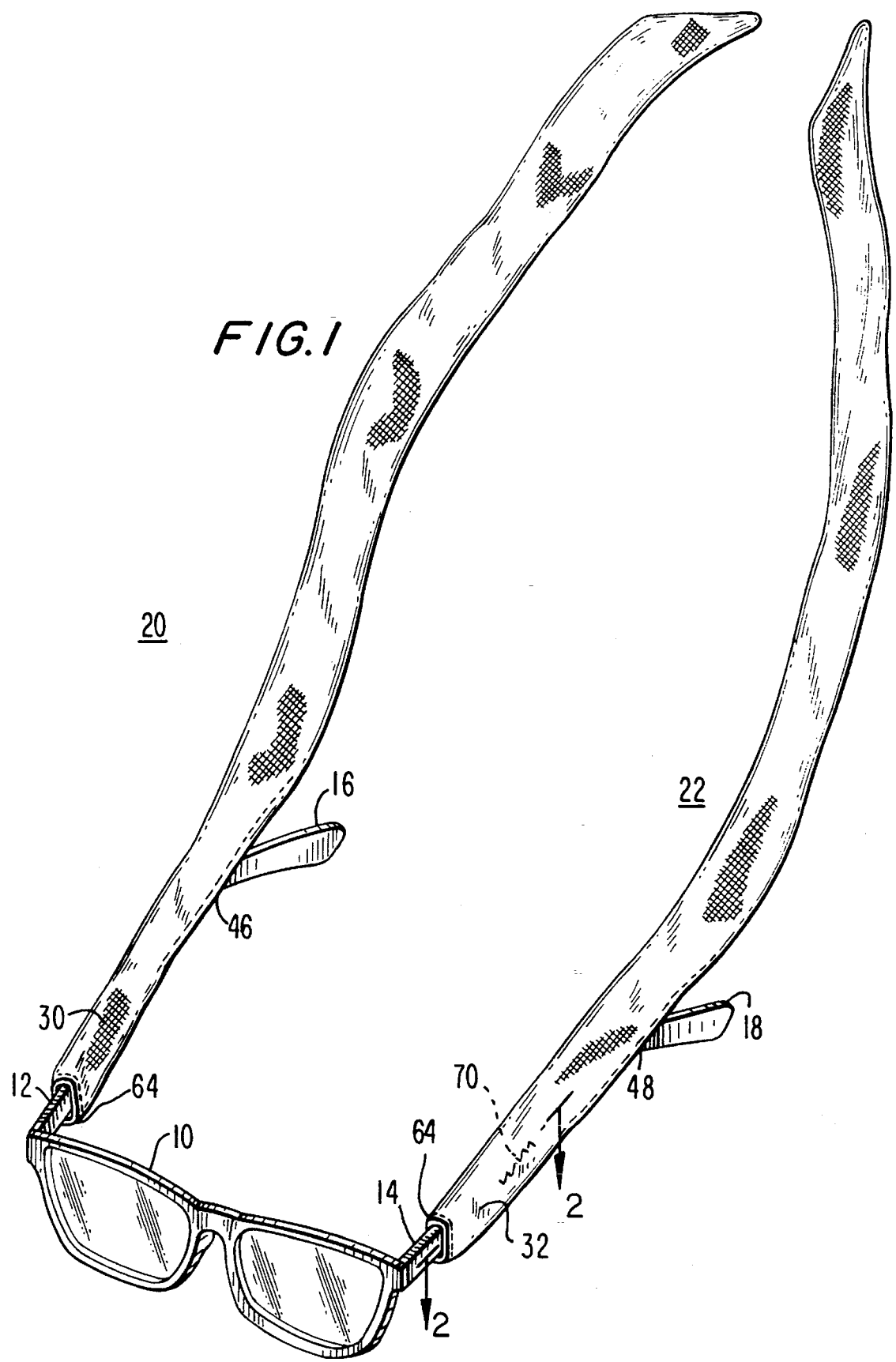
FIG. 1 is a perspective view of the eyeglasses according to the invention with the fashion accessory connected.
Figure 2:
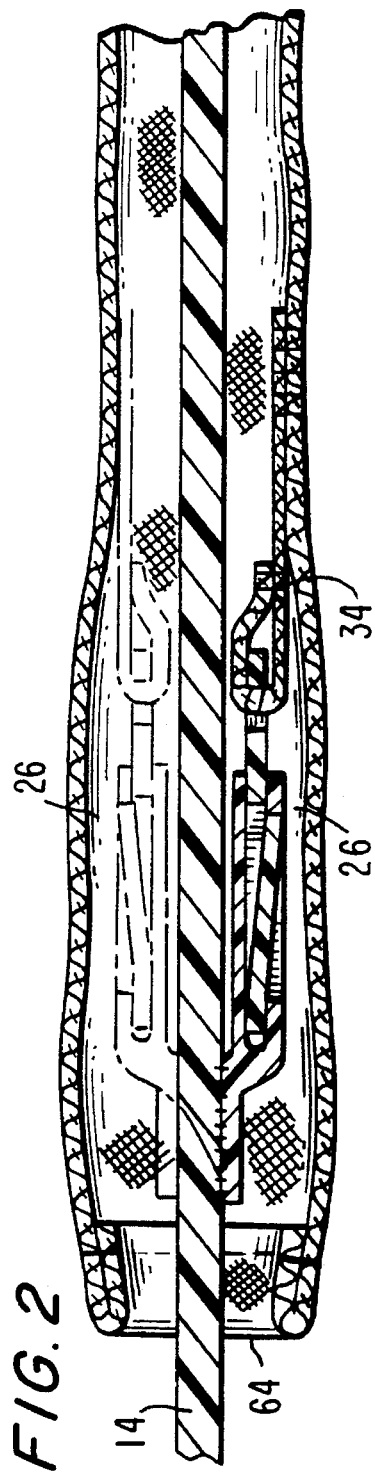
FIG. 2 is a section through 2—2 of FIG. 1.
Figure 3:
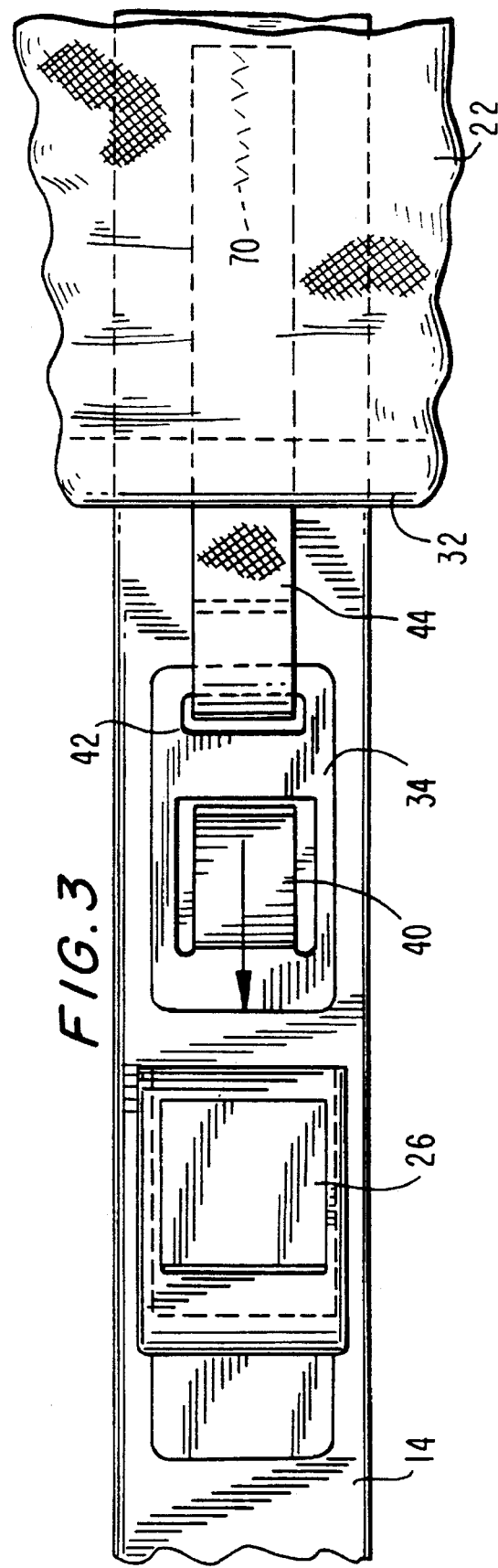
FIG. 3 is partial side view of the eyeglasses showing the connectors of the invention prior to interconnection.

As seen in FIG. 1 eyeglasses, preferably sunglasses 10 having a fashion accessory interconnected thereto are provided. The fashion accessory is preferably headgear and desirably can be a hat, one or more scarves, ear warmers or head ties 20 and 22. Depending on the needs of the user, other fashion accessories may be interconnected to the glasses. As best seen in FIGS. 2 and 3, connector 26 is provided on each temple piece 12 and 14 of glasses 10. As shown in FIG. 2, the connector 26 can be placed either on the outside of the temple pieces as shown in FIG. 2 or on the inner side of the temple pieces 12 and 14 as shown by the phantom lines in FIG. 2. The temple piece connectors can be any one of a variety of connector systems such as a male or female connector for interaction with the appropriate interacting connector. As shown in FIGS. 1, 2 and 3, a female connector is provided along either the inside or the outside of temple pieces 12 and 14.

The headgear preferably left cloth head tie 20 and right cloth head tie 22 has tubular sleeves at one end thereof. The tubular sleeves 30 and 32 contain identical sleeve connectors 34 which mate with temple connectors 26. For example, as shown in FIG. 2 temple connectors 26 are both female connectors of the clip type and mating sleeve connectors 34 are mating male connectors of the clip type. Sleeve connectors 34 are attached to the headwear through the sleeves 30 and 32, by suitably securing them to the sleeves 30 and 32 such as by gluing, sewing, cementing, preferably sewing. Desirably sleeve connectors 34 are secured to both sleeves 30 and 32. The connectors 34 are located a sufficient distance from sleeve openings 64 so that when the sleeve and temple connectors are mated the sleeves 30 and 32 conceal the temple connectors 26 from view. Preferably sleeve connectors 34 are releasably and retractably interconnected to sleeves 30 and 32. Desirably the sleeve connectors 34 can be sewn directly to the sleeves 30 and 32. As shown in FIG. 3, sleeve connector 34 includes a male portion 40 and preferably an integral buckle 42 at the opposite end. Preferably a resilient fabric or elastomeric material 44 preferably resilient nylon is secured to buckle 42, e.g., looped around the buckle. The elastomeric material 44 then can be sewn at 70 to the sleeves 30 and 32 to provide resilient, retractable attachment of the connectors 34 to the tubular sleeve 30 or 32. In operation, the user would pull connector 34 so that it would protrude from a sleeve 30 or 32 and mate it with temple connector 26. Due to the resilient nature of the elastomeric member 44, the connector 34 will retract back inside the tubular sleeve 30 and 32 and the tubular sleeve then will extend along the temple pieces 12 and 14 so that the connectors 34 are hidden from view. Preferably slits 46 and 48 are provided in the head ties 20 and 22 to allow ear pieces 16 and 18 to be fully engaged on the user's ears.

Figure 4:
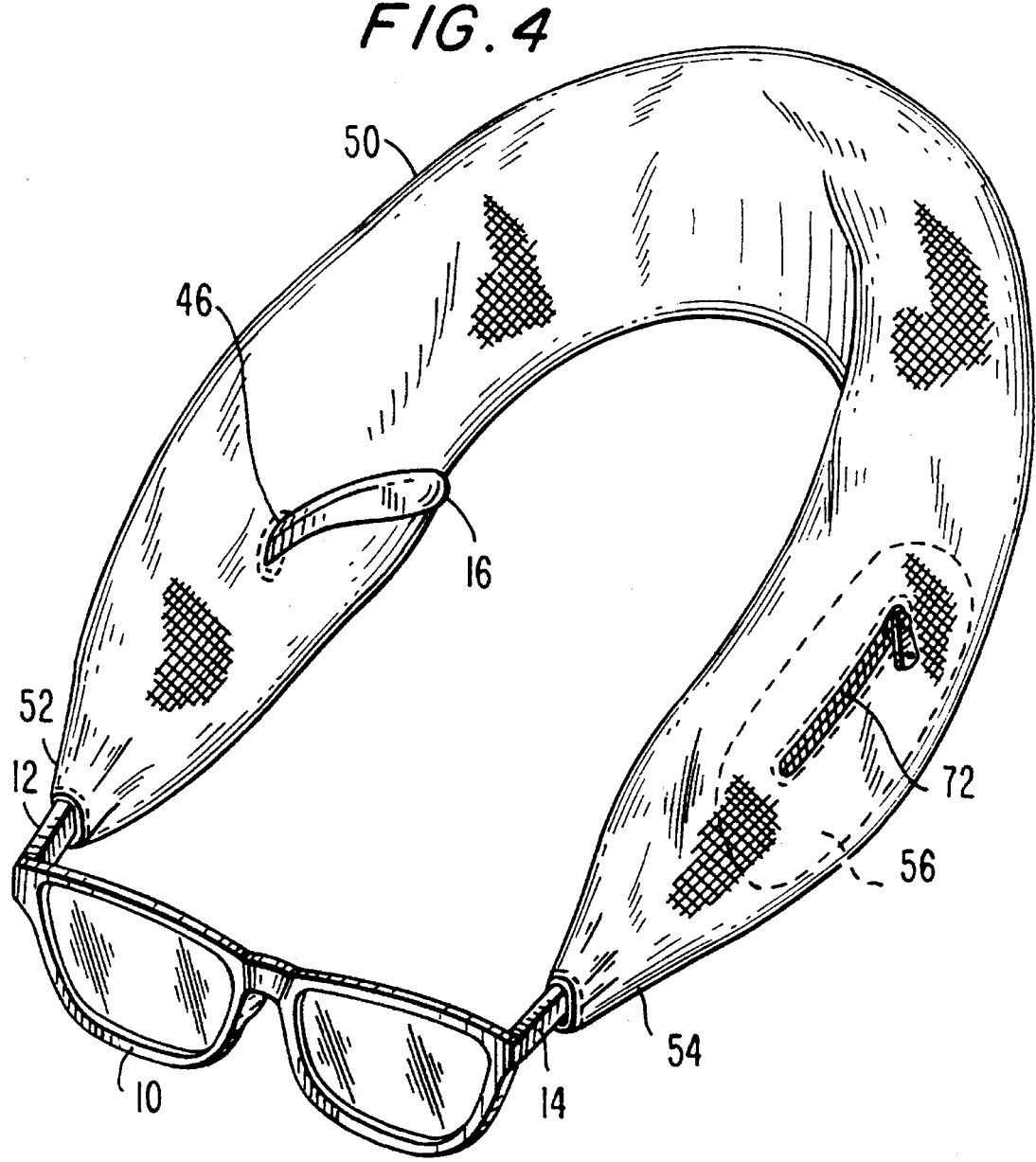
FIG. 4 is perspective view of an alternative embodiment of the invention.

FIG. 4 shows another embodiment of the invention wherein the eyewear accessory is an ear warmer releasably attached to eyeglasses 10. Similar parts are labelled with the same numbers as FIG. 1. In this embodiment an ear warmer 50 is provided for releasable attachment to eyeglasses similar to the embodiment of FIG. 1 with the head ties, sleeves 52 and 54 are provided in the ear warmer wherein the sleeve connectors 34 and 36 are secured. The eyeglasses and temple pieces are the same as in FIG. 1. Optionally a pocket 56 is provided with a zipper 72.

Figure 5:
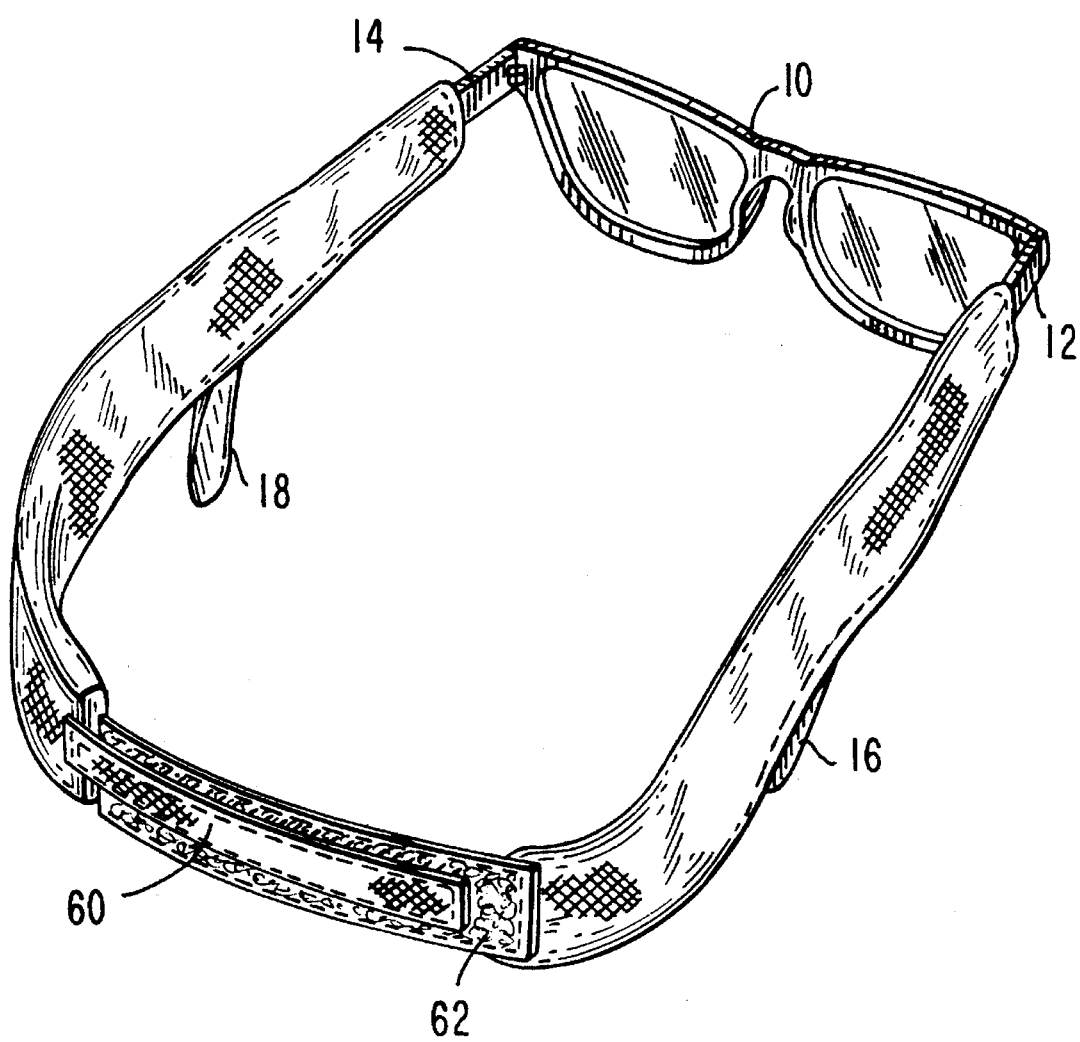
FIG. 5 is a perspective view of an alternative embodiment of the invention.

FIG. 5 shows another embodiment of the invention. Velcro connectors 60 and 62 are provided for easy engagement of the head ties around the head of the user.

In operation, a secure eyeglass and fashion accessory combination is provided. The fashion accessory preferably headgear such as head ties 20 and 22 are securely attached to the temple pieces 12 and 14 through the interconnection of temple connectors 26 with sleeve connectors 34. The sleeve connectors are resiliently and retractably sewn to the sleeves 30 and 32 in head ties 20 and 22 at 70. In use the eyeglasses 10 can be worn and the head ties 20 and 22 tied around the head. The resilient connection between the sleeve connectors 34 and the head ties 20 and 22 allows for comfortable use by the wearer in that once the head ties have been tied, the glasses 10 will give somewhat during use and movement without dislodging from the head of the user. In addition, the connectors 26 and 34 are securely releasably interconnected by the male/female interconnection between temple connectors 26 and the sleeve connectors 34.

The user can interconnect a number of different fashion accessories to his glasses as desired. The sleeve connectors 34 can be easily disconnected by pushing down the tongue 40 of connector 34 and releasing the connector. Different fashion accessories can be added to the glasses. For example, the ear warmer of FIG. 4 can be interchanged for the head ties, FIG. 1. Optionally scarves or different colored head ties can be added to glasses 10. As a result, depending on the color of the wardrobe of the user or the particular event or activity the user contemplates a suitable headgear or other fashion accessory can be added.

The foregoing is considered as illustrative only to the principles of the invention. Further, since numerous changes and modifications will occur to those skilled in the art, it is not desired to limit the invention to the exact construction and operation shown and described above, and accordingly all suitable modifications and equivalents may be resorted to, falling within the scope of the invention.

I claim:

1. Eyeglasses comprising:

eyeglass frames having left and right temple pieces;

a left and right temple connector attached to said left and right temple pieces;

headgear secured on each side to said temple pieces;
said headgear forming a left and right tubular sleeve on opposite sides of said headgear;
said tubular sleeves adapted for receipt of said left and right temple pieces;

a left and right sleeve connector located within said left and right tubular sleeves;

a left side resilient fabric having a front end and a back end;
said left side resilient fabric securely affixed to said left sleeve connector at the front end of said left side resilient fabric;
said left side resilient fabric securely affixed to said left tubular sleeve at the back end of said left side resilient fabric;

a right side resilient fabric having a front end and a back end;
said right side resilient fabric securely affixed to said right sleeve connector at the front end of said right side resilient fabric;
said right side resilient fabric securely affixed to said right tubular sleeve at the back end of said right side resilient fabric;
said left and right sleeve connector positively interlocking with said left and right temple connector to interconnect said headgear to said temple pieces and to prevent dislodging of said headgear from said temple pieces by pulling on said headgear.

2. The eyeglasses according to claim 1 wherein said headgear is cloth.

3. The eyeglasses according to claim 2 wherein said left side and right side resilient fabrics are sewn to said headgear.

4. The eyeglasses according to claim 1 wherein said sleeves conceal the temple connectors.

5. The eyeglasses according to claim 4 further comprising ear pieces located at the end of each temple piece;
openings in said tubular sleeves to allow said ear pieces to extend outwardly from said sleeves for engagement on the ears of the user.

6. The eyeglasses according to claim 1 wherein said left and right sleeve connectors releasably interlock with said left and right temple connectors.

7. Eyeglasses comprising:
eyeglass frames having left and right temple pieces;
a left and right temple connector attached to said left and right temple pieces;

cloth headgear secured on each side to said temple pieces;
said headgear forming a left and right tubular sleeve on opposite sides of said headgear;
said tubular sleeves adapted for receipt of said left and right temple pieces;

a left and right sleeve connector located within said left and right tubular sleeves;
said left and right sleeve connectors having a buckle at one end and an interlocking connector at opposite end;

a left side resilient fabric having a front end and a back end;
said left side resilient fabric securely affixed to said buckle of said left sleeve connector at the front end of said left side resilient fabric;
said left side resilient fabric securely affixed to said left tubular sleeve at the back end of said left side resilient fabric;

a right side resilient fabric having a front end and a back end;
said right side resilient fabric securely affixed to said buckle of said right sleeve connector at the front end of said right side resilient fabric;
said right side resilient fabric securely affixed to said right tubular sleeve at the back end of said right side resilient fabric; and
said left and right sleeve connectors positively and releasably interlocking with said left and right temple connectors to interconnect said headgear to said temple pieces and to prevent dislodging of said headgear from said temple pieces by pulling on said headgear.

8. The eyeglasses according to claim 7 wherein said left and right sleeves extend along said temple pieces to hide said left and right temple connectors from view.

9. The eyeglasses according to claim 8 wherein said headgear is selected from the group of head ties, scarves and earwarmers.

10. The eyeglasses according to claim 8 wherein said headgear is a left and right head tie.

11. The eyeglasses according to claim 8 wherein said headgear is a left and right scarf.

* * * * *